(12) United States Patent
Shepherd

(10) Patent No.: US 6,622,425 B2
(45) Date of Patent: Sep. 23, 2003

(54) PORTABLE GREENHOUSE CART

(76) Inventor: Mary K. Shepherd, 3637 Tracy Rd., Atoka, TN (US) 38004

( * ) Notice: Subject to any disclaimer, the term of this patent is extended or adjusted under 35 U.S.C. 154(b) by 0 days.

(21) Appl. No.: 09/992,472

(22) Filed: Nov. 14, 2001

(65) Prior Publication Data
US 2002/0088171 A1 Jul. 11, 2002

Related U.S. Application Data

(60) Provisional application No. 60/249,400, filed on Nov. 15, 2000.

(51) Int. Cl.$^7$ ................................................ A01G 9/00
(52) U.S. Cl. ............................................................ 47/17
(58) Field of Search ................................ 47/59–63, 18, 47/39

(56) References Cited

U.S. PATENT DOCUMENTS

| | | | |
|---|---|---|---|
| 147,849 A | 2/1874 | Leslie | |
| 1,153,028 A | 9/1915 | Chalk | |
| 3,095,670 A | 7/1963 | Raab | 47/17 |
| 3,106,801 A | 10/1963 | Risacher | 47/17 |
| 3,324,593 A * | 6/1967 | Strasser | 47/58.1 R |
| 3,762,573 A * | 10/1973 | Collins et al. | 211/34 |
| D237,898 S * | 12/1975 | Austin | D11/144 |
| 4,045,911 A | 9/1977 | Ware | 47/39 |
| 4,170,844 A * | 10/1979 | Steele | 47/62 R |
| 4,316,347 A | 2/1982 | Smith | 47/17 |
| 4,527,707 A * | 7/1985 | Heymann et al. | 220/571 |
| 4,621,739 A * | 11/1986 | Heymann et al. | 211/74 |
| 4,794,727 A * | 1/1989 | Smith | 47/17 |
| 4,850,134 A | 7/1989 | Snekkenes | 47/18 |
| 4,899,487 A | 2/1990 | Brownlee | 47/41.01 |
| 5,095,649 A | 3/1992 | Brownlee | 47/41.01 |
| 5,318,315 A * | 6/1994 | White et al. | 280/47.26 |
| 5,351,976 A * | 10/1994 | Penson | 280/47.35 |
| 5,448,853 A | 9/1995 | Harman | 47/60 |
| 5,570,540 A | 11/1996 | Womack et al. | 47/39 |
| 5,675,932 A | 10/1997 | Mauney | 47/62 |
| 5,927,745 A * | 7/1999 | Cunningham | 280/652 |
| 6,029,398 A | 2/2000 | Sporer | 47/65 |
| 2001/0047617 A1 * | 12/2001 | Blossom | 47/62 R |

FOREIGN PATENT DOCUMENTS

| | | | | |
|---|---|---|---|---|
| GB | 2030835 | * | 4/1980 | A01G/3/02 |
| GB | 2137464 | * | 10/1984 | A01G/9/00 |

OTHER PUBLICATIONS

LBS Group, Horticultiral & Amenity Supplies, Buyers Guide 2001, p. 81 and front and back covers,.*

* cited by examiner

Primary Examiner—Charles T. Jordan
Assistant Examiner—Francis T. Palo
(74) Attorney, Agent, or Firm—Wyatt, Tarrant & Combs, LLP

(57) ABSTRACT

A portable, wheeled greenhouse includes a chassis that can be wheeled, having upper and lower end portions. The upper end portion includes a tub-like reservoir with side walls and a bottom wall. One or more racks are supported upon the combination of wheeled chassis and tub and above the bottom of the tub so that each rack is sized and shaped to support and suspend a plurality of potted plants above the bottom, yet close enough to the bottom of the tub so that any water that is optionally contained within the tub contacts the supported pots and waters them via wick action. A translucent or transparent canopy fits about the combination of tub and chassis, the canopy can include a support frame with a cover.

17 Claims, 10 Drawing Sheets

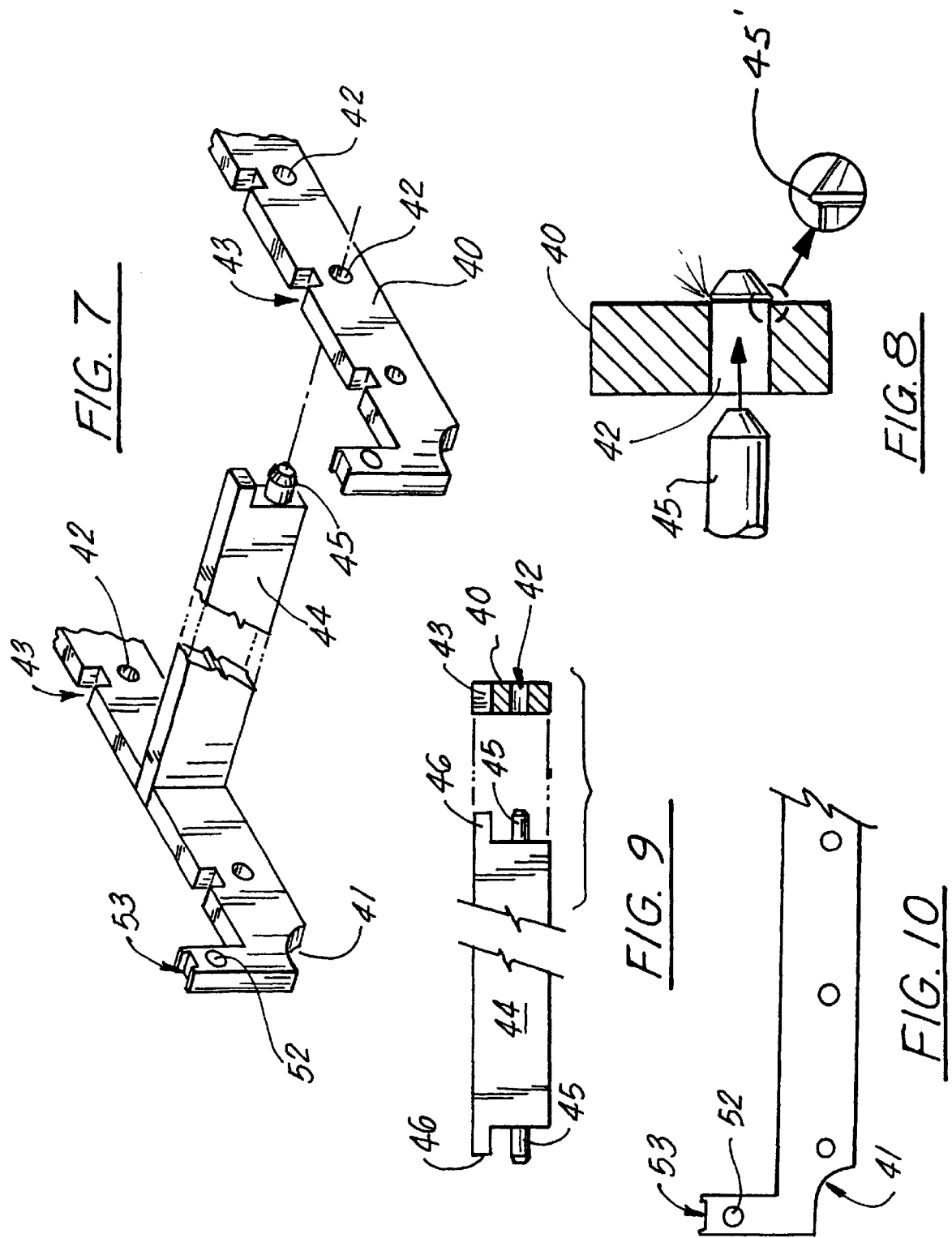

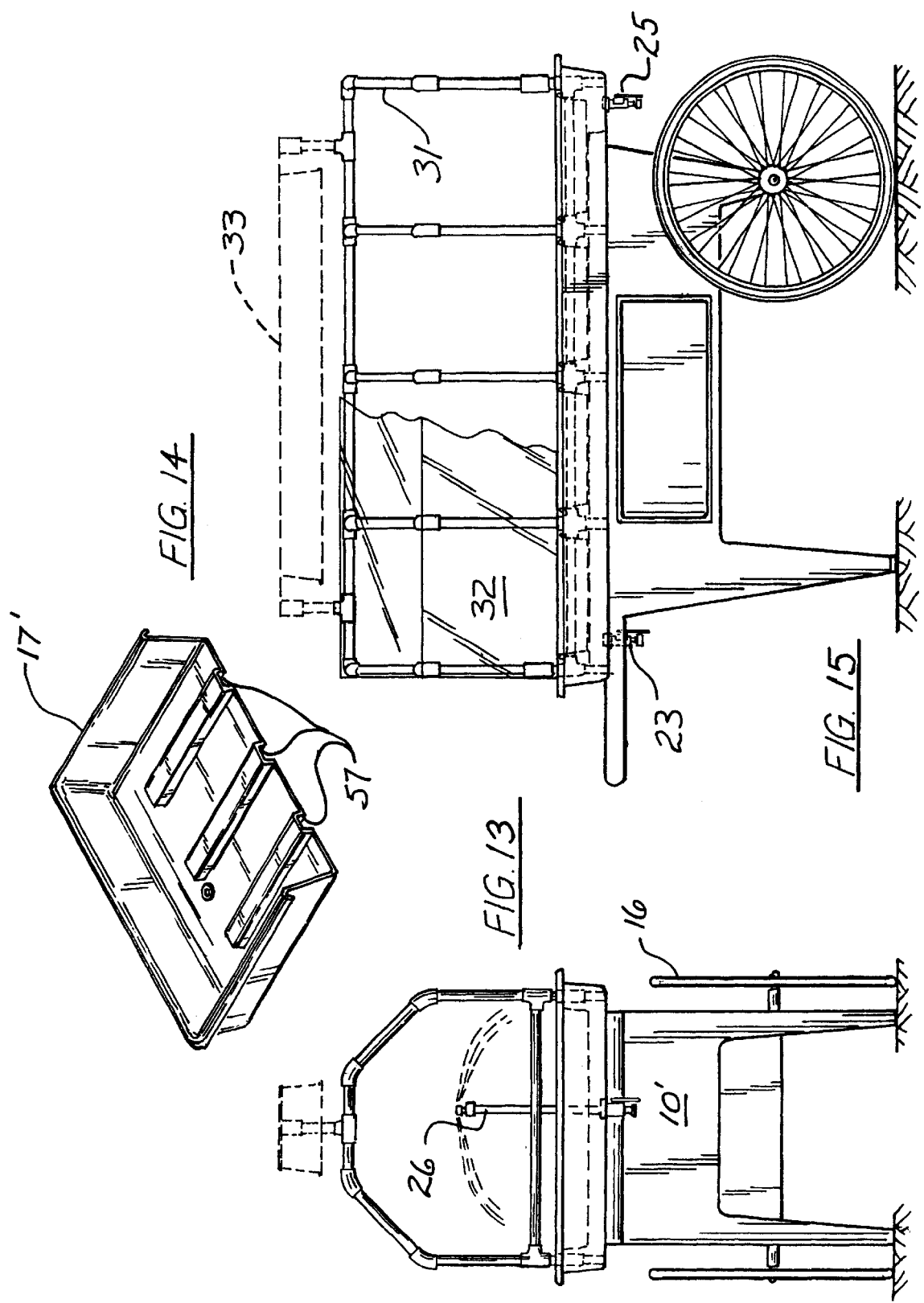

PORTABLE GREENHOUSE CART

CROSS-REFERENCE TO RELATED APPLICATIONS

This application claims priority of Provisional Patent Application Ser. No. 60/249,400 filed Nov. 15, 2000.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to portable greenhouses and more particularly to a portable, wheeled greenhouse having an improved construction that includes a frame that supports a water containing tub or reservoir that has fittings for enabling water to be piped to and from the tub. A series of movable racks is supported by the frame above the tub and at a position that suspends pots from the racks and into the tub wherein the pots may extend into water and the plants receive water via osmosis from water contained within the tub.

2. General Background of the Invention

Several patents have issued for portable greenhouse arrangements. These include the following:

| PATENT # | TITLE | ISSUE DATE |
|---|---|---|
| 147,849 | Fountain, Aquarium, and Flower-Pot Stands | 02/24/1874 |
| 3,095,670 | Seed Starter and Plant Propagator | 07/02/1963 |
| 3,106,801 | Portable Electric Greenhouse | 10/15/1963 |
| 4,045,911 | Versatile Horticultural Growth Apparatus | 09/06/1977 |
| 4,316,347 | Portable Solar Garden | 02/23/1982 |
| 4,794,727 | Wheel-About Greenhouse | 01/03/1989 |
| 4,850,134 | Growth Chamber With Solar Energy Absorber | 07/25/1989 |
| 4,899,487 | Storage and Display Receptacle Assembly | 02/13/1990 |
| 5,095,649 | Storage Receptacle Assembly | 03/17/1992 |
| 5,448,853 | Plant Growing Apparatus | 09/12/1995 |
| 5,570,540 | Seedling House | 11/05/1996 |
| 5,675,932 | Plant Growing System | 10/14/1997 |
| 6,029,398 | Multi-Compartmentalized Plant Container | 02/29/2000 |

The Risacher U.S. Pat. No. 3,106,801 discloses a portable electric greenhouse that includes a small receptacle having a transparent cover that fits over the receptacle.

A wheeled storage and display receptacle assembly for display and/or storage of floral items is disclosed in the Brownlee U.S. Pat. No. 4,899,487.

A wheel-about greenhouse is disclosed in the Kevin Smith U.S. Pat. No. 4,794,727. The Smith patent includes a wheeled frame. A pair of wheels are attached to the frame for wheeling the device about. A clear cover fits the upper edge of the frame.

The Harman U.S. Pat. No. 5,448,853 discloses a portable plant growing cart that can accommodate one or more plant trays thereon. The cart is constructed of rigid frames which are pivotally connected together so as to aid the storage of the cart when not in use. A movable light source is supported from the separate frames above the trays at any desired elevation. Additionally, a fabric like reflective shroud is supported over both the light source and the cart so as to reflect light back towards the plant trays when desired.

A seedling house is disclosed in U.S. Pat. No. 5,570,540 issued to Womack. The seedling house includes a number of shelves that have openings for receiving pots.

BRIEF SUMMARY OF THE INVENTION

The portable greenhouse cart of the present invention provides a household size of greenhouse for use inside or outside the house in such as a Florida Room, screen room, patio, or in a garage or cellar. The cart provides most of the features of a free-standing greenhouse, however, in a size that may be conveniently utilized in restricted spaces, and freely moved to take advantage of natural sunlight, or, for other convenience, in moving about the inside quarters.

Fundamentally, the cart includes a watertight tub or pan mounted on wheels (such as bicycle wheels), disposed generally at one of the tray and legs (perhaps also including casters). In the inside periphery of the tub is disposed a rack (or racks) for holding seed flats, pots and the like, the rack(s) may be comprised of multiple assembleable preformed rods or slats having ends for detachable assembly into spaced holes which are set at predetermined positions coordinated such that the adjacent slats support standard sized seed flats and pots, with the rack(s) capable of being readily broken down and reassembled to accommodate different sized flats or pots.

In a preferred embodiment of assembleable racks, the slats have a projection resembling the shape of an arrowhead which may be closely and locally received into a rectangular or a round hole in an adjacent slat. Main framing slats (tray bars) may include an additional keying projection to be closely received by a notch disposed in the slat adjacent the spaced holes.

The tray or tub provides a fluid containing reservoir and is preferably adapted with a drain in the underside of the tray along with a water inlet connected to an internal watering system within the tray.

The internal watering system may include such as spaced nozzles activated by water pressure such that the dispensing nozzle rises out of the nozzle housing to spray a limited region of the tray. Watering nozzles similar to smaller lawn sprinklers are preferred.

The tray may be fitted with an overhead framework for supporting an awning like cover, preferably transparent or translucent, to enable sunlight or artificial light (from an included fixture) to flood the plants and encourage seed germination and plant growth. For further enhancing the growth properties of the cart, a low power heating coil may be disposed adjacent the cart underside to provide supplemental heating should heating be desired.

The portable greenhouse and plant cart of the present invention is engineered and designed to provide improved growth and environmental control for germination of flower, vegetable, and herb seeds. This allows for a great head start on the growing season in residential gardens. Particularly in climates with a late spring, this product is also designed to serve alternatively as a patio vegetable, herb, and flower cart garden. The portable greenhouse of the present invention can also be used in a garage or outside building for storing ferns and potted plants through winter months.

Anyone who has ever gardened agrees that there is joy in nurturing a tiny seed and watching it grow into a robust plant. The portable greenhouse of the present invention, with its controllable climates, is ideally suited for starting plants from tiny little seeds such as perennials, annuals, herbs, and vegetables.

The apparatus of the present invention features a lightweight frame that can be constructed of such as durable lightweight pipe (e.g., one (1) inch PVC) with elbows and tees to form, for example, a 2'×4' or 4'×6' cart with bicycle size wheels. The one (1) piece bottom pan forming the tub can be formed from hard plastic to prevent corrosion or breakage. Tray holders are preferably formed from hard plastic with adjustable spacing rods for seed flats and pot holders.

In its preferred embodiment, the portable greenhouse has water hose and electrical heat hookups, a clear plastic cover, and an adjustable light located on top of the cart. A heat cord in the bottom of the pan with temperature control would keep the cart at a consistent temperature based on ambiance. The portable greenhouse temperature controls need to be set at 70–75 degrees F. for seedling and propagating cutting; a warm 65 degrees F. for the germination of most seeds; and 80 degrees F. for tropical varieties.

The cart is preferably about thirty inches high and makes gardening easy for everyone. This is the same height as a desk, and is ideal height for sliding a chair underneath while working on plants. This height would make gardening available for the physically challenged and elderly.

For the germination of seeds each 2'×4' cart could hold four seed flats. Each flat could hold eighteen three packs, six six packs, six nine packs, eighteen two packs, and eighteen 3½×3½" pots. The eighteen three packs and the six nine packs could yield fifty-four plants per flat and a total of 216 plants per cart. The six six packs and the eighteen two packs could yield thirty-six plants per flat and a total of 144 per cart. The eighteen 3½"×3½" pots could yield eighteen plants per seed flat and a total of 72 plants per cart.

The 4'×6" cart could hold twelve seed flats. The eighteen three packs and six nine packs could yield fifty-four plants per seed flat for a total of cart 648 plants per cart. The six six packs and eighteen two packs could yield thirty-six plants per flat and a total per cart of 432. The eighteen 3 ½×3½" pots could yield eighteen plants per seed flat and a total for cart of 216 plants. A user could have half flowers and half vegetables or other desired combination.

When using the cart as a patio flower, vegetable and/or herb garden, a gardener starts with seeds or small plants. Plants are repotted in larger pots and placed in the cart on the patio, screen porch, etc. of home or apartment.

A drain valve is provided in the tub or bottom pan to drain off excess water from the cart. A garden hose will hook up to the valve so that water can be drained into a sink or outside if the cart is to be used inside. When using the cart outside, water can be drained into flower beds or onto the ground.

The watering system includes an adjustable sprinkler head that can be positioned in the center of the cart. With PVC pipe extensions the sprinkler head rises above the potted plants. Simply twist the top of the sprinkler head to adjust the water flow radius.

The wick system is another watering method that can be used for certain plants (e.g., saintpaulias). The wick watering system is made up of two parts: (1) the upper section serves as a flowerpot and (2) the lower serves as the saucer-reservoir, holding water and liquid fertilizer. The wicks in the bottom of the pots operate on the principle of the oil lamp, drawing water instead of oil. The wick pots offer a healthful and convenient way to grow African-violet.

The top of the cart features an adjustably positioned light that is removable and swing-away. With different types of light attachments the light could range from full spectrum lighting to a heating lamp.

The cover for the portable greenhouse can be manufactured from lightweight clear durable plastic, which allows light penetration while providing protection from insects and birds. The lightweight plastic material would also help reduce heat and moisture loss. The cover can be removed after seed germination, converting the portable greenhouse into a plant cart for a patio garden. The lightweight cover is preferably easily folded and stored in the tool holder on front of the cart or in a storage area. A flap located on top of the cover with a Velcro® fastener addresses ventilation needs.

The adjustable tray holders can be manufactured from a hard plastic to prevent corrosion or breakage. The tray connection bar ends can be tapered in both directions, allowing them to easily lock in place when a short taper is passed through the rail. The connection bars can have holes to accept the taper lead-ins and snap taper, plus being notched to have a flash top so the cups or pots can sit evenly on all sides.

The bar rail, which holds the plants, is designed to rest on the pipe frame on both ends and have connection bar holes on about two inch centers. The completed tray holders can be quickly and easily converted to hold all standard cups, pots, and seed flats and can be adjusted by the customer for different uses.

The portable greenhouse and plant cart of the present invention is designed for easy use and assembly. It can be entirely of plastic materials to prevent breakage and corrosion, and enabling easy cleanup after use. Large wheels can make moving the cart effortless, and a large handle on the front of the cart can also aid in moving the cart. The holder or tray on front of the cart will hold small gardening tools and gloves.

The greenhouse cart of the present invention is engineered to make gardening or the germination of plants easier for everyone. It takes away the hassle of traditional gardening methods for those individuals who may have trouble handling the work load, or simply do not have a lot of gardening space and for people who are just looking for an easier method.

The tray holder can be manufactured from a hard plastic to prevent corrosion or breakage while allowing for some flexibility. It can be made in different colors to easily identify the lengths. Tray connection bars ends are preferably tapered in both directions to allow for an easy lead-in and snap to lock connection. It locks in place when passed the short taper on the inside.

The connection bars have holes to accept the taper lead-in and snap taper, plus it is notched to have a flush top so the cups or pots can set evenly on all sides.

The bar rail is designed to rest on the PVC pipe frame on both ends and have connection bar holes on about 2 inch centers. Two of the connection bars can be used as a handle on both ends.

The completed tray holder can be quickly and easily converted to hold all standard cups, pots and flats plus can be customer adjusted for special uses.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 7 is a partial perspective exploded view of a preferred embodiment of the apparatus of the present invention;

FIG. 8 is a fragmentary sectional view of a preferred embodiment of the apparatus of the present invention;

FIG. 9 is a partial elevation view of a preferred embodiment of the apparatus of the present invention showing the connecting bar and bar rail prior to assembly;

FIG. 10 is a partial end view of a preferred embodiment of the apparatus of the present invention illustrating one of the bar rails.

FIG. 13 is an end view of the alternative embodiment of the apparatus shown in FIG. 11;

FIG. 14 is a partial pictorial view of the tub of the apparatus shown in FIG. 11; and FIG. 15 is an elevational view of the apparatus shown in FIG. 11, with a portion of the cover cut away.

DETAILED DESCRIPTION OF THE INVENTION

Figure 1:
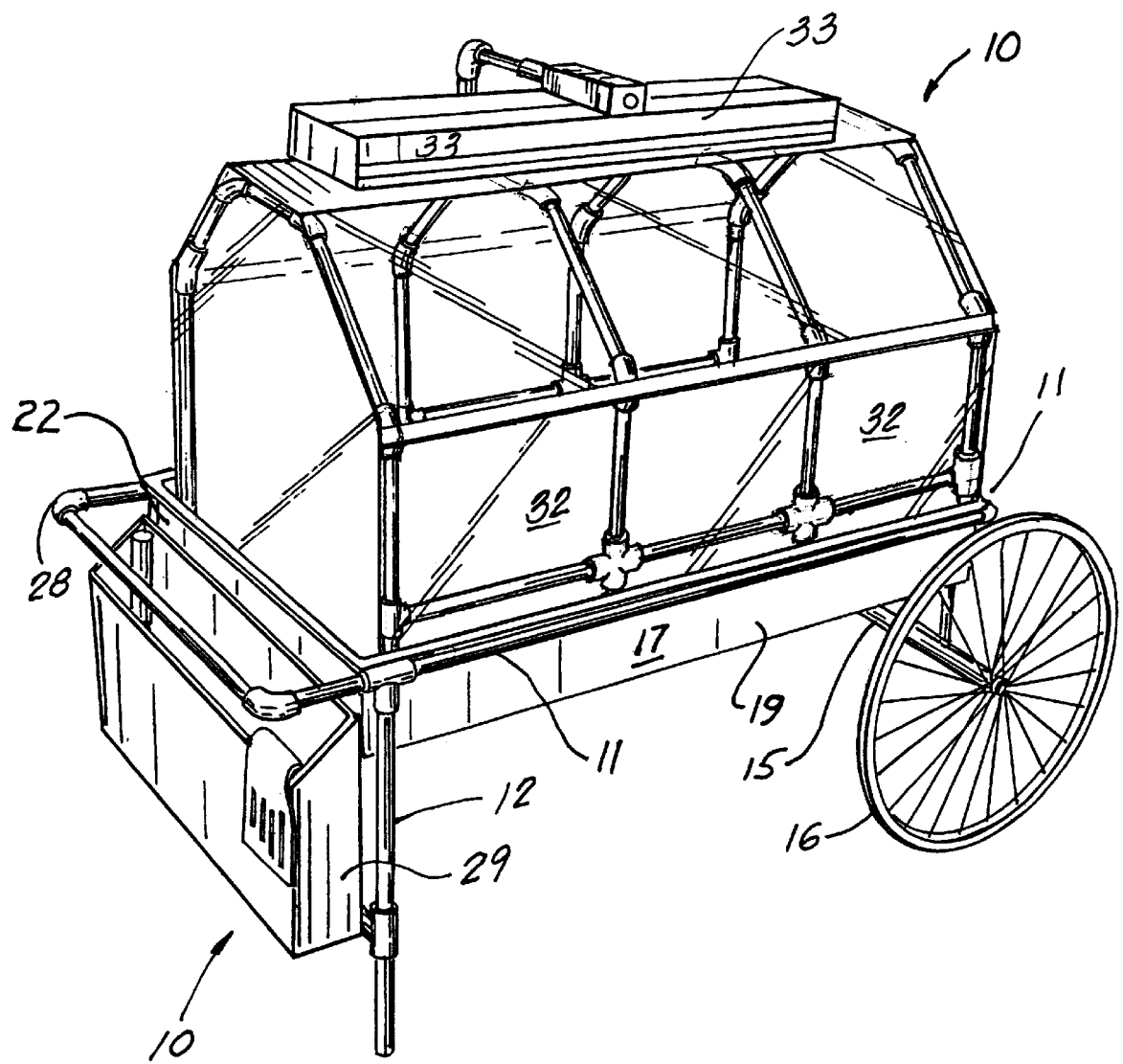
FIG. 1 is a perspective view of a preferred embodiment of the apparatus of the present invention.
Figure 2:
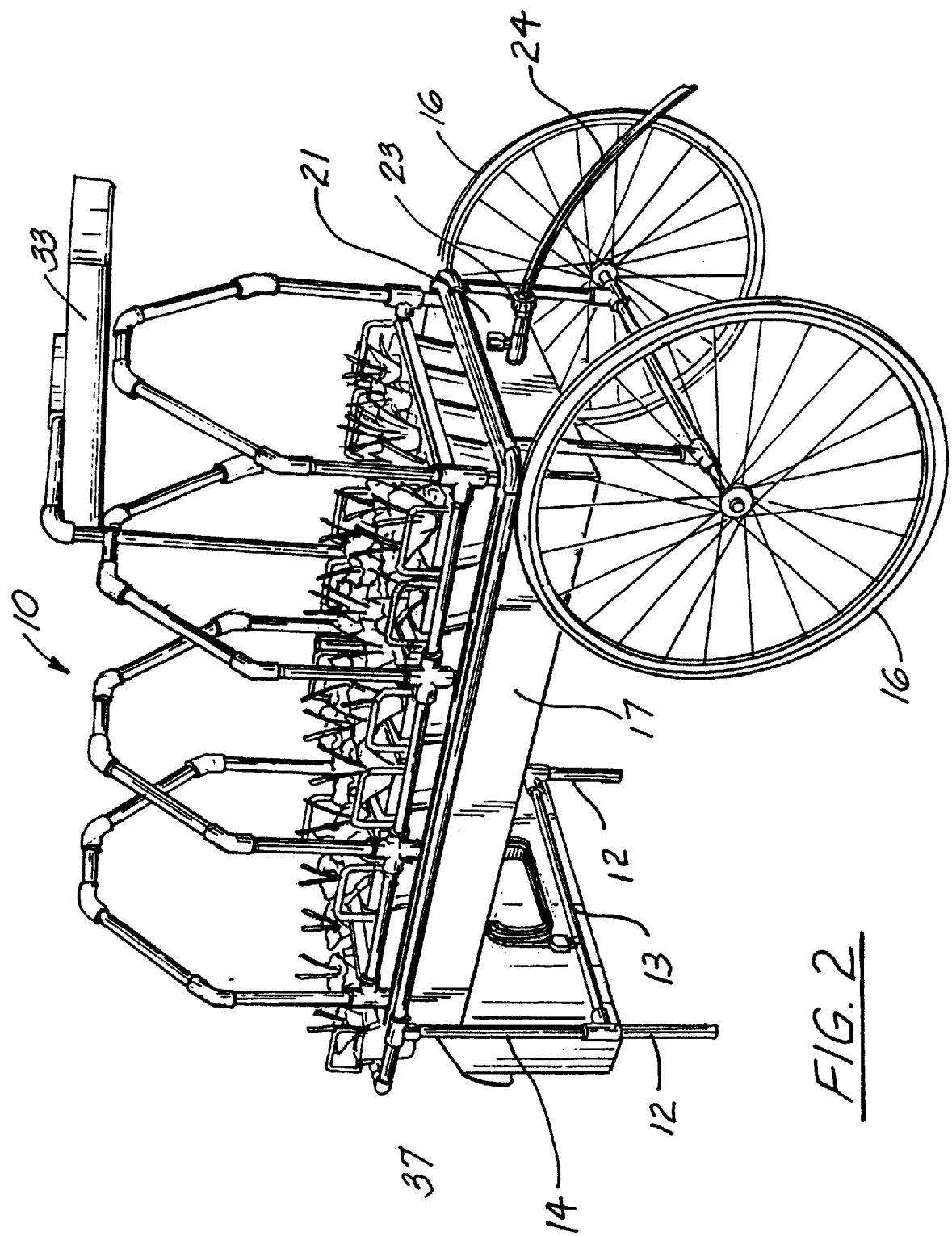
FIG. 2 is a side perspective view of a preferred embodiment of the apparatus of the present invention.
Figure 3:
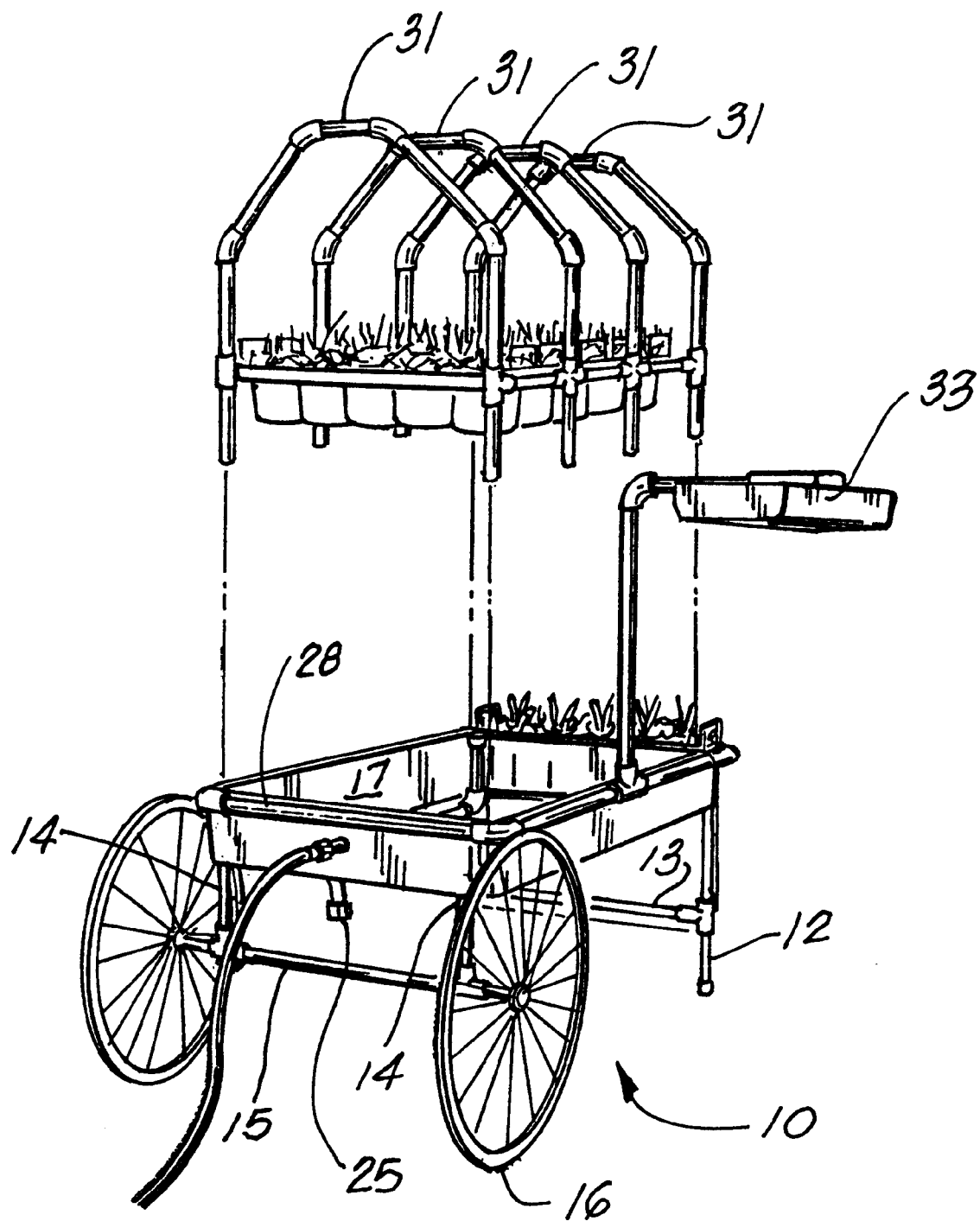
FIG. 3 is an end perspective view of a preferred embodiment of the apparatus of the present invention.

FIGS. 1–11 show a preferred embodiment of the apparatus of the present invention designated generally by the numeral 10 in FIGS. 1 and 2. In FIGS. 3, 4, 5 and 6, the apparatus 10 of the present invention is shown with the cover removed for clarity.

Portable greenhouse cart apparatus 10 has a frame 11 that includes a large tub or reservoir 17 manufactured for example of plastic or metallic construction and supported by legs 12, horizontal braces 13, vertical members 14 and horizontal braces 15 that can function as axles. A pair of spaced apart wheels 16 are attached to frame 11 opposite handle 28.

Tub 17 is preferably a liquid containing vessel or reservoir that can be manufactured of any material that will hold water or a mixture of water and liquid fertilizer. The tub 17 has a bottom wall 18 and a plurality of side walls 19, 20 as well as end walls 21, 22. One of the side walls 19, 20 or end wall 21, 22 can include a fitting 23 that communicates with inlet flow line 24. Flow line 24 is provided for adding water to the interior of tub 17 such as during a filling of the tub such as by hose 24' attached to fitting 23 or when it is desired that water should be sprayed upon potted plants that are growing in pots 38, 39 supported by racks 34, 35.

A drain fitting 25 can be used to drain water from tub 17 if it is desired to water plants using spray head 26 and not through wicking action. As with fitting 23, drain fitting may be connected to a hose 24' (not shown) so that drain water may be directed to a convenient disposal area.

Spray head 26 can be mounted at one end portion of inlet flow line 24, preferably a riser section that positions the spray head 26 above any potted plants that are growing in pots 38, 39 on racks 34, 35. If desired for additional coverage, multiple spray heads 26 may be positioned at selected locations in tub 17.

Figure 4:
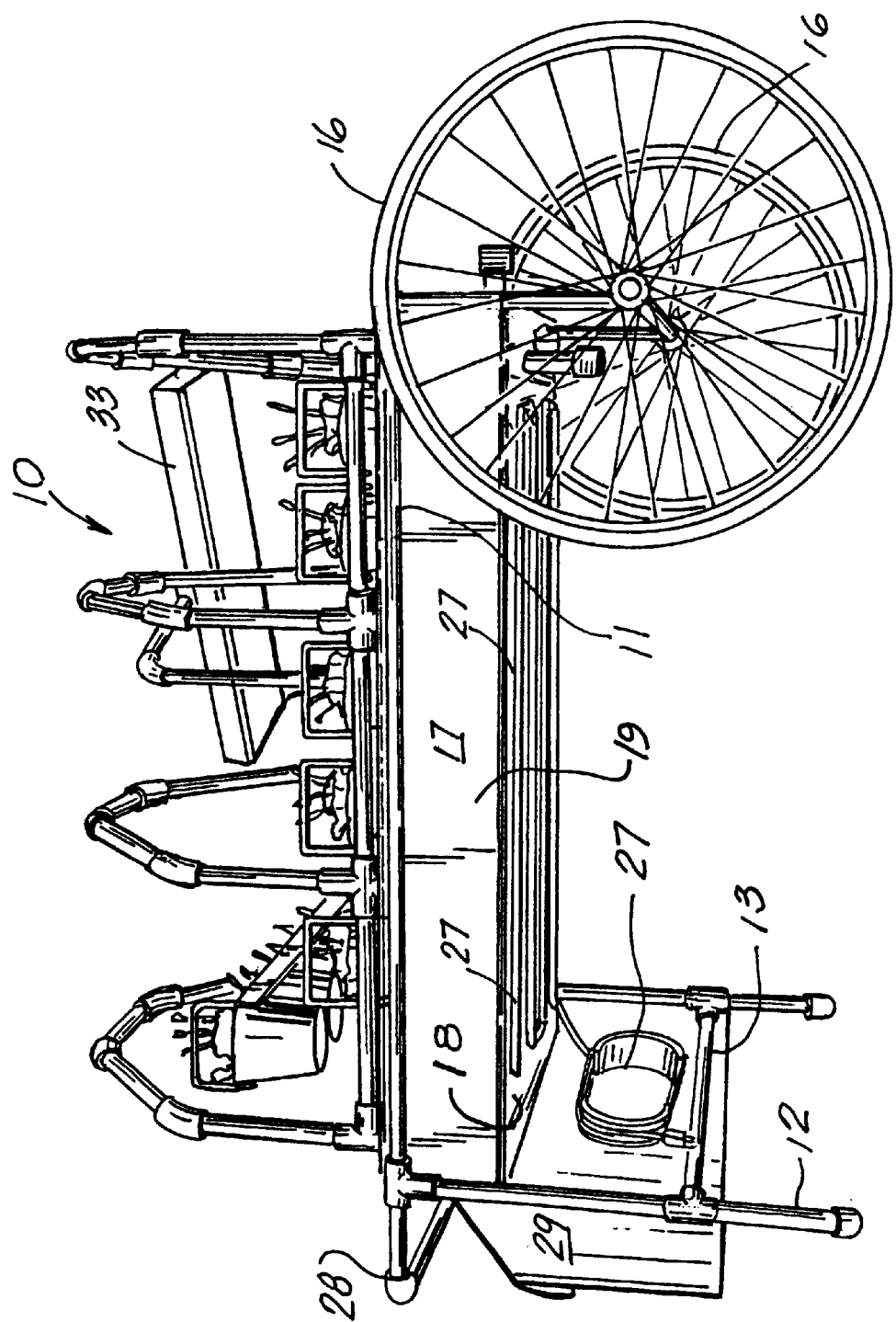
FIG. 4 is side perspective view showing the under side of a preferred embodiment of the apparatus of the present invention.
Figure 5:
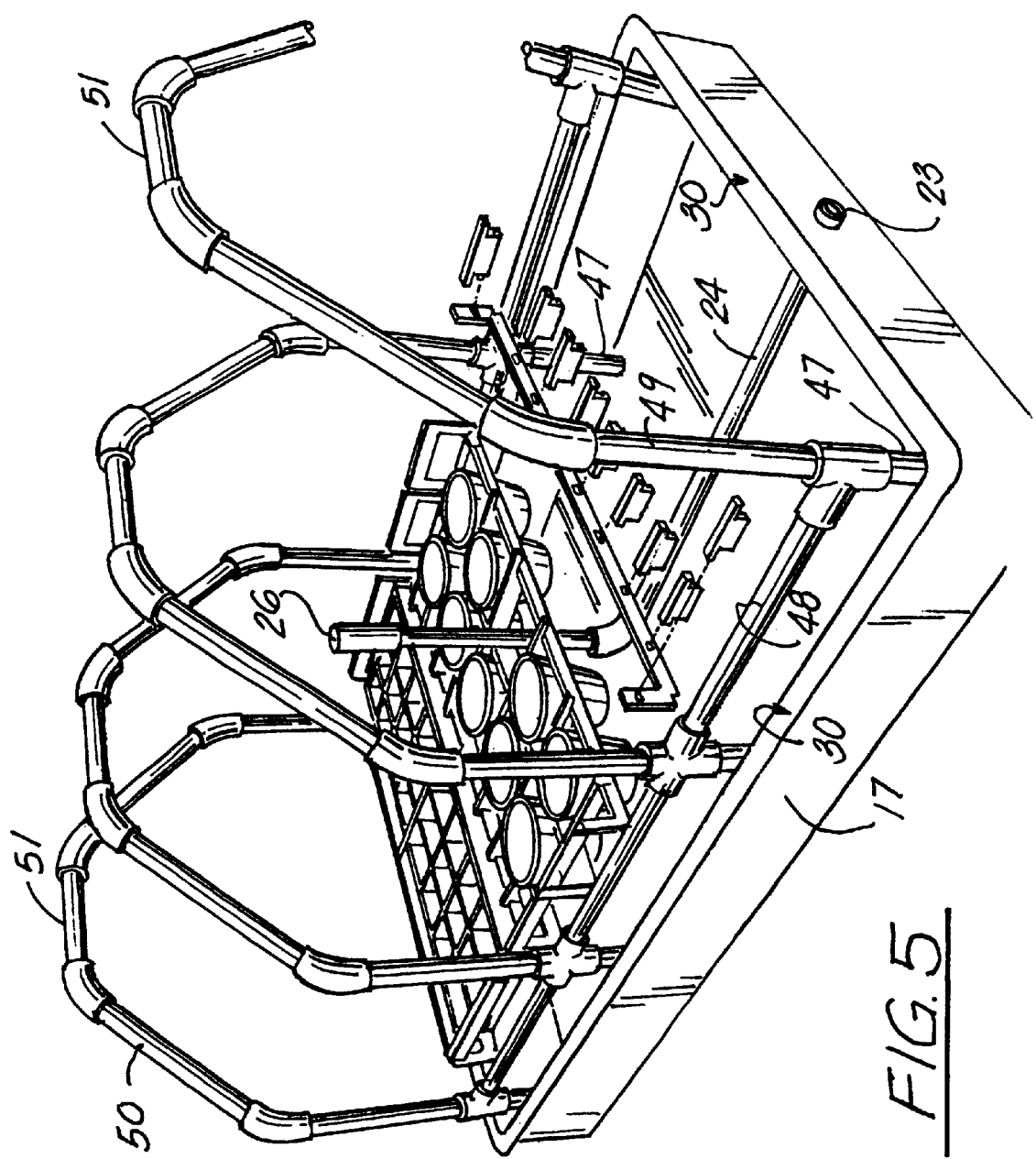
FIG. 5 is a partial perspective exploded view of a preferred embodiment of the apparatus of the present invention.
Figure 6:
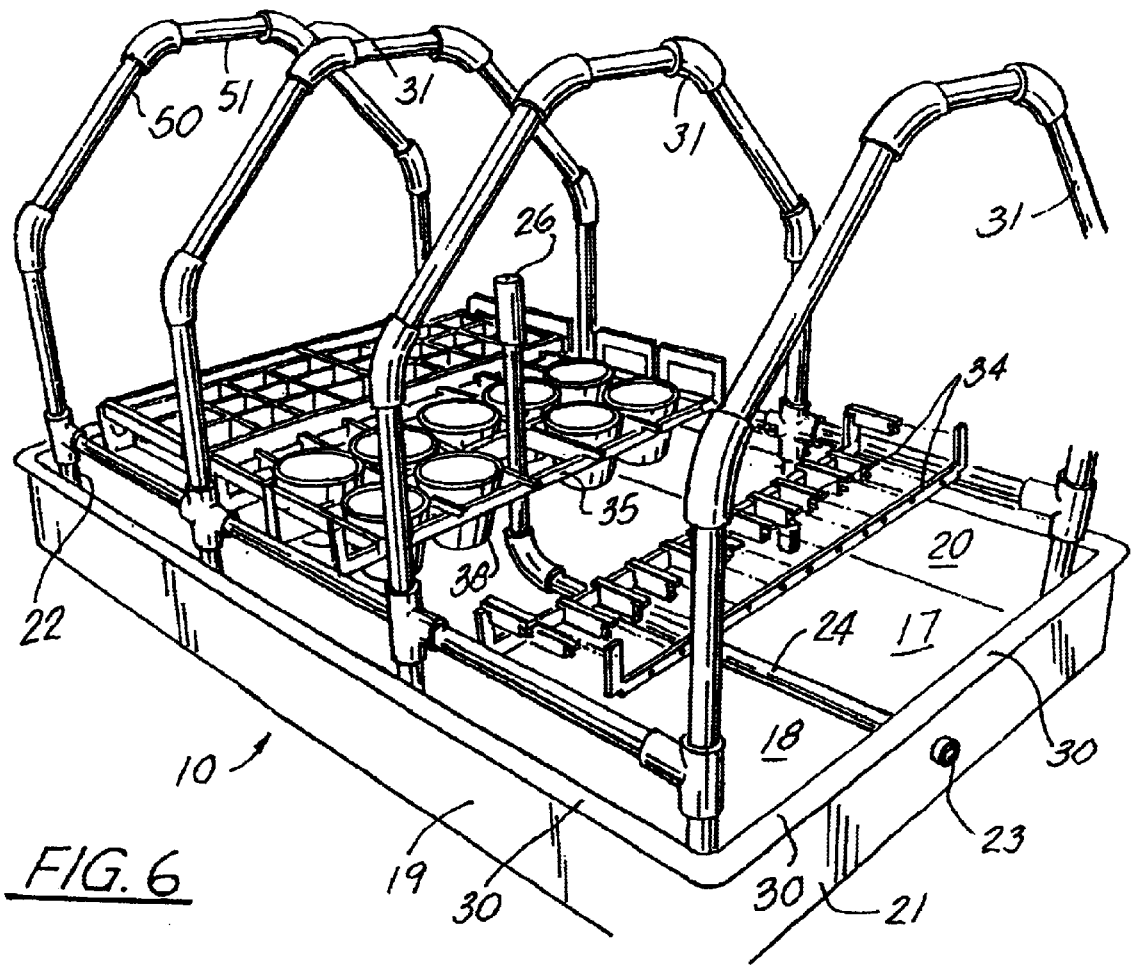
FIG. 6 is a partial perspective view of a preferred embodiment of the apparatus of the present invention.
Figure 11:
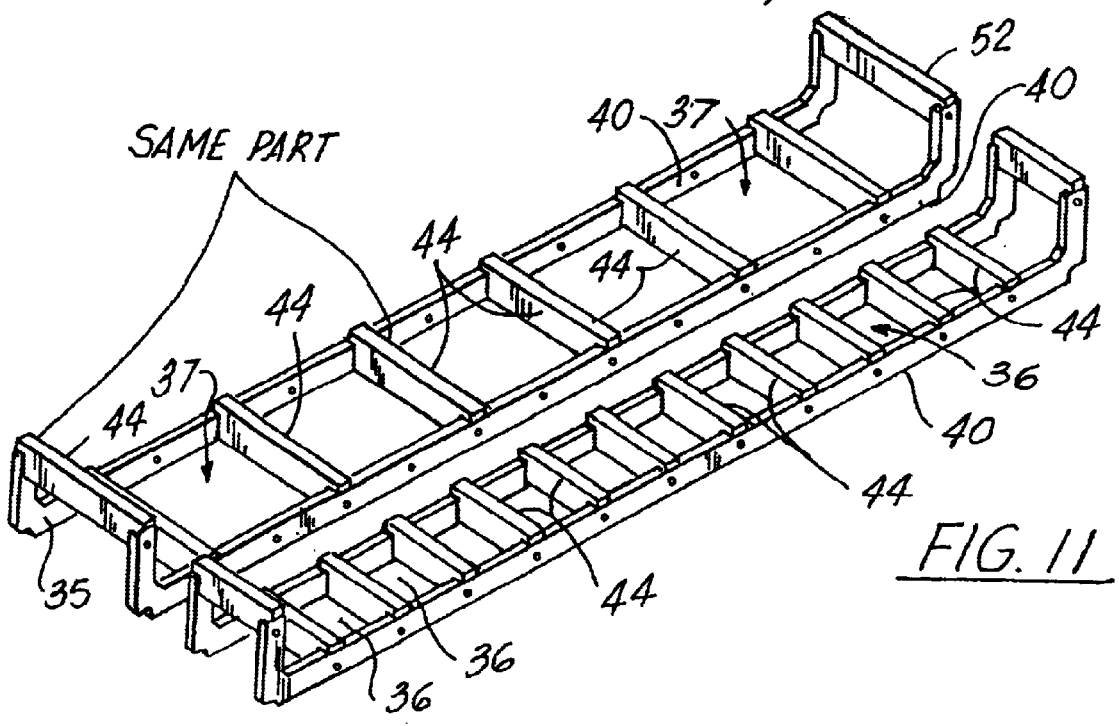
FIG. 11 is a partial perspective view of a preferred embodiment of the apparatus of the present invention illustrating two of the racks.

A heater 27 can be provided for heating tub 17 and/or water that is contained within tub 17. Conventional electrical strip heaters such as low wattage flexible strips available from such as Watlow Electric Manufacturing Company or Omega Engineering, Inc. may be disposed below tub 17 as illustrated in FIG. 4. Selection of a particular strip will be influenced by the amount of heat to be supplied to tub 17 as well as the material of which it si composed.

Handle 28 is positioned opposite wheels 16 and can support storage tray 29 as shown in FIG. 1.

A frame 31 is provided that supports translucent cover 32. Cover 32 can be translucent or transparent as desired. The illustrated cover 32 is a unitary structure of clear plastic such as Lexane® polycarbonate material available from General Electric Company, Inc. Alternatively, cover 32 may be translucent should it be desirable to shield the contents of cart 10 from view. Likewise, individual sheets of plastic material may be attached to selected frame members 31, either permanently or with detachable means such as screws, clips and clamps. Also, within the scope of the present invention, cover 32 may be a flexible clear plastic or fabric which is conveniently draped over frame 31.

A lamp 33 is supported above translucent or transparent cover 32. The lamp 33 is preferably mounted upon a swivel or pivoting post so that the lamp 33 can be rotated away from cover 32 such as when the cover 32 is to be removed.

Frame 31 is comprised of a number of framed parts that include legs 47, horizontal supports 48, vertical sections 49, inclined sections 50, and horizontal sections 51 as shown in the drawings.

The frame 31 can be a unitary structure that can be lifted from tub 17, as in the preferred embodiment. The leg portions 47 of frame 31 can simply rest upon the bottom 18 of tub 17. Framed parts illustrated are of such as ½ inch to 1 inch diameter PVC pipe using connectors such as elbows, "T"s and sleeves. Alternatively, metal tubing of steel, aluminum and similar materials may be utilized as well as analogous angular or strip materials. Preferable materials are those light in weight such that the overall weight of cart 10 does not impeded its movement.

A plurality of racks 34, 35, preferably of different internal size for accommodating pots of different diameters are supported by frame 31 and more particularly by the horizontal supports 48. Each rack 34, 35 has respective openings 36, 37 of differing dimensions so that a plurality of racks 34, 35, or additional racks can carry a number of pots 38, 39 (or other pots) of differing diameters.

Each rack 34, 35 is constructed of bar rails 40 and connecting bars 44. This construction of racks 34,35 can best be seen in FIGS. 5–11. In their preferred embodiment, each bar rail 40 has end portions with notches 41 that fit the horizontal supports 48 of frame 31. Openings 42 in bar rails 40 receive pegs 45 of connecting bars 44. In the preferred embodiment illustrated in FIG. 11, peg 45 includes a detent 45' which cooperates with the bar rail 40 at opening 42 to retain peg 45 therein. Each bar rail 40 has notches or recesses 43 that receive horizontal projections 46 that are at the end portions of connecting bars 44 as shown in FIGS.

7–11. The bar rails are connected together using a plurality of connecting bars 44 as shown in FIGS. 7–9 wherein the pegs 45 of connecting bars 44 fit into in a snap fashion the openings 42 in bar rails 40. As may be best seen in FIG. 11, connecting bars 44 may be fabricated of differing lengths as illustrated, such that openings 38 may be readily varied in size to accommodate different sized pots.

In the embodiment of racks 34, 35 illustrated, openings 42 are spaced at a preselected distance x which is then also the operative length of the smallest cross or connecting bars 44. The distance x is selected to be slightly smaller than the diameter of a planting pot to be ultimately positioned into racks 34, 35. Additional sizes of cross or connecting bars 44 are provided which are of an operative length of such as 2× and 3×. By this coordinated sizing, racks 34, 35 may be readily fabricated from bar rails 40 and connecting bars 44 of differing sizes to accommodate larger pots as well.

Figure 16:
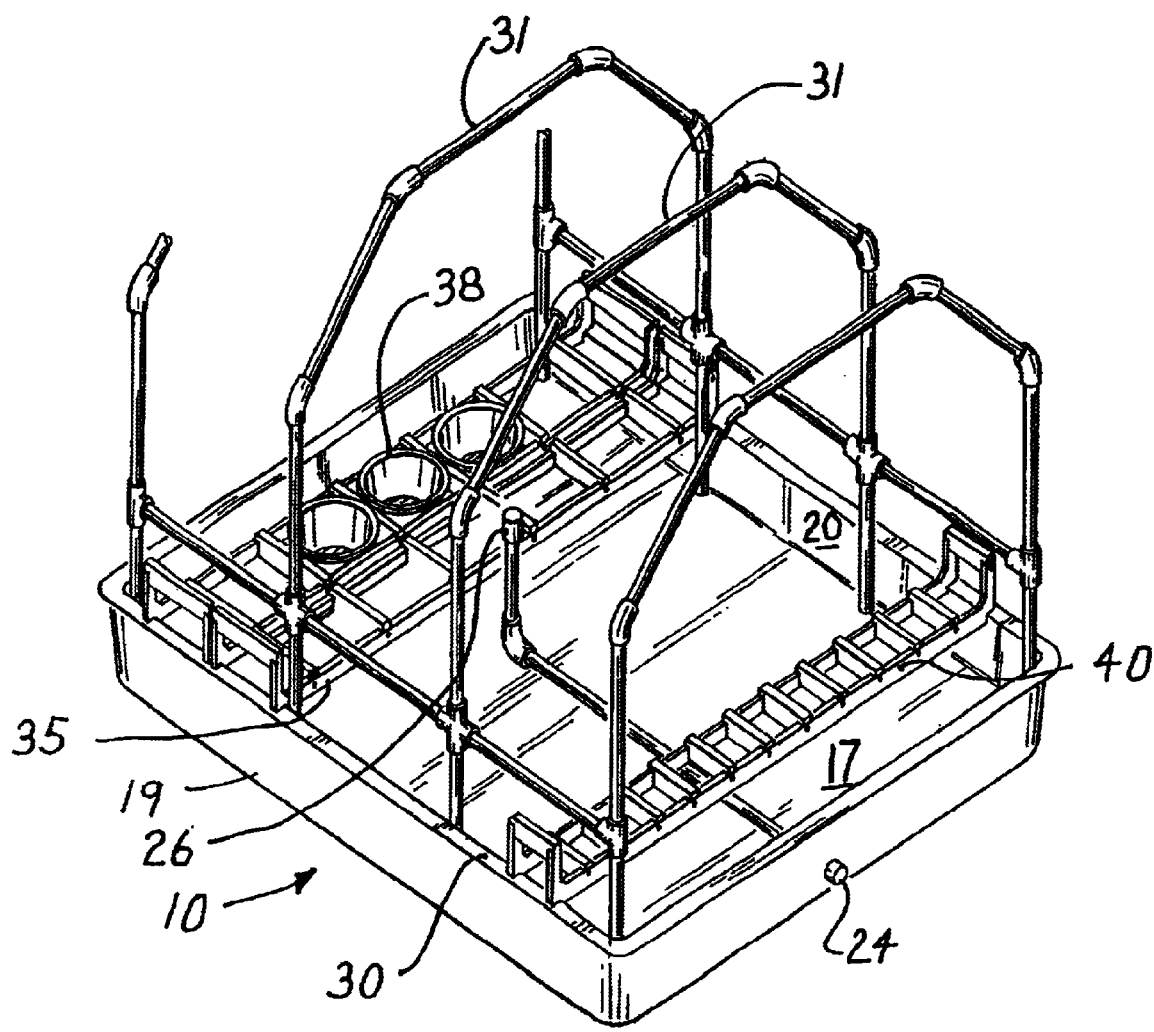
FIG. 16 is a partial perspective view of an alternative embodiment of the apparatus of the present invention.

Completed pot racks 34,35 are shown in FIG. 16. Each completed pot rack 34,35 includes at least a pair of spaced apart bar rails and a plurality of connecting bars 44. Handles 52 can be fitted to the end portions of each bar rail 40. The handles 52 have a similar configuration to the connecting bars 44, so that projections 46 and pegs 45 of each handle 52 fit the recess 53 and opening 54 that are provided at opposing ends of bar rail 40.

Each of the racks 34,35 provides preferably a plurality of openings, each for receiving a pot. These openings are smaller for the rack 34 wherein the openings are designated generally by the numeral 36. These openings are larger for the rack 35, designated by the numeral 37. Openings 36, 37 can thus be provided of a variety of dimensional configurations for accommodating either rounded or squared pots, or pots of other shapes, as well as pots of differing diameters and dimensions.

Figure 12:
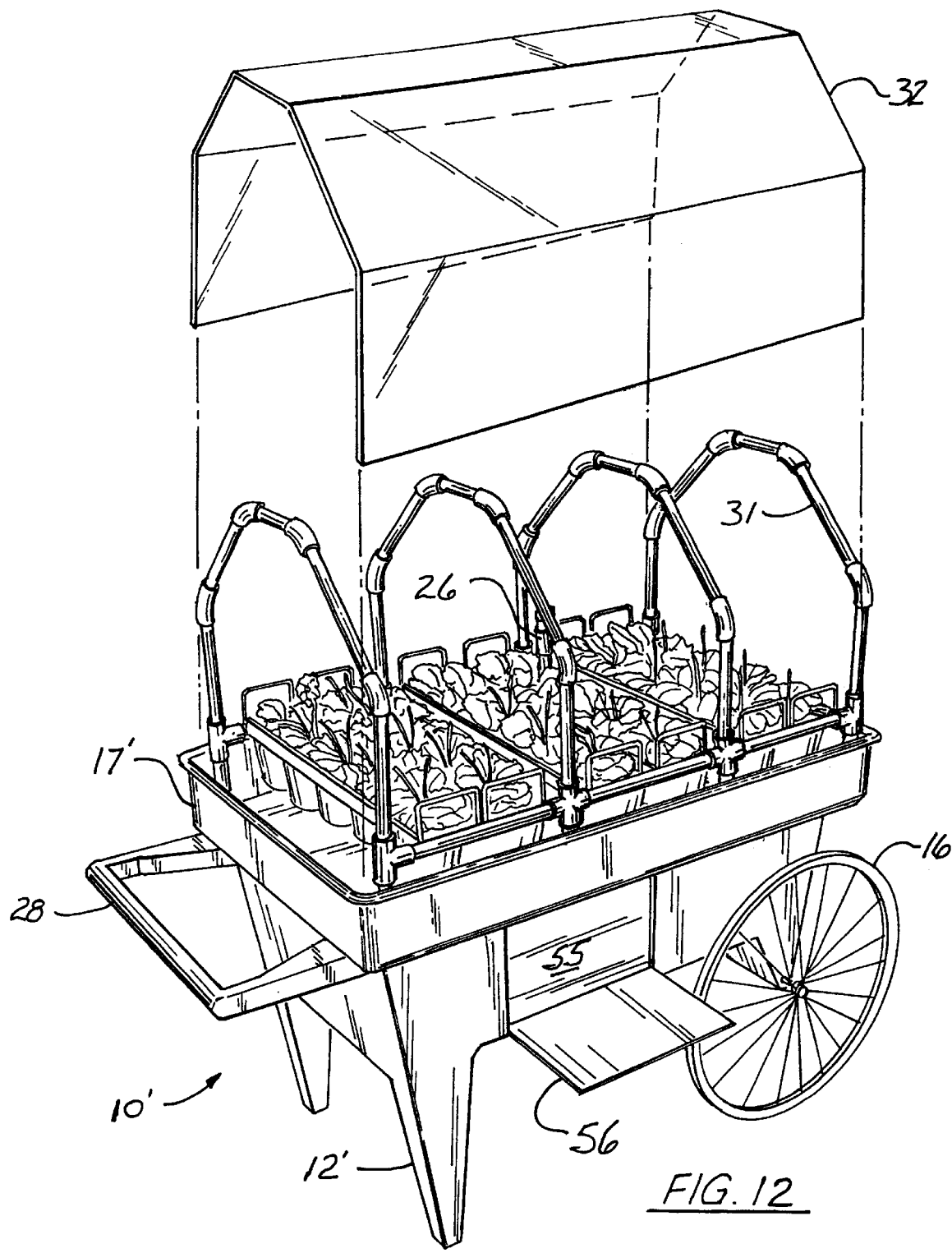
FIG. 12 is a perspective view with the cover exploded, of an alternative embodiment of the apparatus of the present invention.

FIGS. 12–15 illustrate an alternative embodiment of the portable greenhouse cart apparatus 10 of the present invention. As illustrated in FIGS. 12 and 15, the frame 11, legs 12, braces 13 vertical members 14 and tub or reservoir 17 illustrated in the FIGS. 1–11 are incorporated into a molded chassis, wherein legs 12' are an integral part of chassis 10'. Likewise, the tub or reservoir 17' is a molded unit, affixed to chassis 10' as by welding, adhesives or mechanical fasteners, according to the materials chosen for the chassis, i.e., plastics or metal. By forming an integral chassis, a storage area 55 may be incorporated, including a closable door 56 to secure the contents of storage area 55 when not in use.

The remaining aspects of chassis 10' are similar to those previously illustrated and described. FIG. 14 illustrates tub or reservoir 17' including elongated groves 57 in which heating elements as previously described may be disposed.

The following is a list of suitable parts and materials for the various elements of the preferred embodiment of the present invention.

PARTS LIST

| | |
|---|---|
| 10 | greenhouse cart apparatus |
| 10' | integral chassis |
| 11 | frame |
| 12 | leg |
| 12' | integral leg |
| 13 | horizontal brace |
| 14 | vertical member |
| 15 | horizontal brace |
| 16 | wheel |

-continued

PARTS LIST

| | |
|---|---|
| 17 | tub |
| 17' | integral tub |
| 18 | bottom |
| 19 | side wall |
| 20 | side wall |
| 21 | end wall |
| 22 | end wall |
| 23 | fitting |
| 24 | inlet flowline |
| 24' | hose |
| 25 | drain |
| 26 | spray head |
| 27 | heater |
| 28 | handle |
| 29 | storage tray |
| 30 | upper edge |
| 31 | frame |
| 32 | translucent cover |
| 33 | lamp |
| 34 | rack |
| 35 | rack |
| 36 | opening |
| 37 | opening |
| 38 | pot |
| 39 | pot |
| 40 | bar rail |
| 41 | notch |
| 42 | opening |
| 43 | recess |
| 44 | connecting bar |
| 45 | peg |
| 45' | detent |
| 46 | projection |
| 47 | leg |
| 48 | horizontal support |
| 49 | vertical section |
| 50 | inclined section |
| 51 | horizontal section |
| 52 | handle |
| 53 | recess |
| 54 | opening |
| 55 | storage area |
| 56 | door |
| 57 | groove |

The foregoing embodiments are presented by way of example only; the scope of the present invention is to be limited only by the following claims.

What is claimed is:

1. A portable, wheeled greenhouse comprising:

a) a wheeled chassis;

b) the upper end portion of the chassis including a reservoir with end walls, side walls and a bottom wall;

c) a plurality of racks that are each supported upon the reservoir above the bottom, each rack being sized and shaped to support and suspend a plurality of potted plants above the bottom, yet close enough to the bottom so that when water is contained in the reservoir it contacts the supported pots;

d) a frame comprising a plurality of generally U-shaped frame members having side legs, at least one of said frame members being disposed in the reservoir adjacent each end wall;

e) a plurality of horizontal supports, disposed between and secured to the side legs of said frame members, generally adjacent the side walls of the reservoir, whereby said frame members are fixed in parallel upright relation;

f) a translucent canopy that fits about the reservoir supported by the upper end frame members.

2. The portable wheeled greenhouse of claim 1 wherein there are a plurality of rack sections, each movable with respect to the others.

3. The portable wheeled greenhouse of claim 1 wherein the rack is supported above the reservoir on the horizontal supports of the frame.

4. The portable wheeled greenhouse of claim 1 wherein the upper portion of the chassis has one or more flow fittings for transmitting water between the reservoir and the exterior of the reservoir.

5. The portable wheeled greenhouse of claim 4 wherein the fitting is a drain fitting.

6. The portable wheeled greenhouse of claim 4 wherein the fitting is a water inlet fitting.

7. The portable wheeled greenhouse of claim 4 further comprising a spray head supported by the reservoir and extending above the racks.

8. The portable wheeled greenhouse of claim 6 further comprising a plurality of spray heads supported by the reservoir above the racks.

9. The portable wheeled greenhouse of claim 2 wherein the chassis has a pair of side walls and a pair of end walls, and the racks extend between opposing side walls or end walls.

10. A portable, wheeled greenhouse comprising:
  a) a wheeled chassis;
  b) the upper end portion including a reservoir with side walls and a bottom wall;
  c) a frame comprising a plurality of generally U-shaped frame members having side legs, at least one of said frame members being disposed in the reservoir adjacent each end wall;
  d) a plurality of horizontal supports, disposed between and secured to the side legs of said frame members, generally adjacent the side walls of the reservoir, whereby said frame members are fixed in parallel upright relation;
  e) a rack system supported by the chassis, including a plurality of elongated linear racks that span between opposing side walls, the racks being movable upon the chassis into different locations along a path that is generally perpendicular to each rack; and
  f) a translucent canopy that fits about the reservoir supported by the upper end portion of the chassis.

11. A portable, wheeled greenhouse comprising:

a generally rectangular shaped chassis having a front end, a read end and elongated sides connecting said end portions;

a vertical support disposed on the chassis front end and a vertical support disposed on the chassis rear end, the lower aspect of at least one of said vertical support sections having a pair of wheels disposed thereon, and disposed generally outwardly of the elongated sides of said chassis at said vertical support;

the upper portion of the chassis having disposed therein a reservoir with side walls and a bottom wall;

a plurality of racks each of which being supported upon the side walls of the reservoir above the bottom wall, each rack being sized and shaped to support and suspend a plurality of containers for potted plants above the bottom wall, the bottom of said containers being disposed generally adjacent and above the bottom wall whereby the reservoir may be at least partially filled with a fluid, so that said fluid contacts the supported pots;

a frame disposed on the chassis and extending upwardly therefrom, said frame terminating at its upwardly extent in a canopy support, the perimeter of which substantially overlays the reservoir; and a translucent canopy disposed on the canopy support and extending downwardly over the frame a distance which encloses the reservoir supported by the upper portion of the chassis.

12. A portable, wheeled greenhouse according to claim 11 wherein the chassis includes a light support and light disposable generally above the canopy support.

13. A portable, wheeled greenhouse according to claim 11 wherein the reservoir has disposed a fitting for connection of a water supply to the reservoir.

14. A portable, wheeled greenhouse according to claim 13 wherein said fitting internally of the reservoir is connected to a spray head disposed at a level above the racks whereby water may be sprayed so as to fall on the racks and their contents.

15. A portable, wheeled greenhouse according to claim 11 wherein the reservoir has disposed in the lower extent thereof a drain fitting for the selective removal of fluid from the reservoir.

16. A portable, wheeled greenhouse according to claim 11 wherein an external heating element is disposed on the underside of the bottom wall of the reservoir.

17. A portable, wheeled greenhouse according to claim 16 wherein the external heating element is an electrical strip heater.

* * * * *